United States Patent [19]

Loce et al.

[11] Patent Number: 5,689,343
[45] Date of Patent: Nov. 18, 1997

[54] AREA MAPPING EMPLOYING REFERENCE CLUSTERS FOR HIGH QUALITY NONINTEGER RESOLUTION CONVERSION WITH ENHANCEMENT

[75] Inventors: Robert P. Loce, Webster; Ronald E. Jodoin, Pittsford; Ying-wei Lin, Penfield, all of N.Y.

[73] Assignee: Xerox Corporation, Stamford, Conn.

[21] Appl. No.: 451,376

[22] Filed: May 26, 1995

[51] Int. Cl.⁶ .............................. H04N 1/40; G06K 9/62; G06K 9/42; G06K 15/00
[52] U.S. Cl. .................. 358/298; 358/448; 395/112; 395/128; 382/209; 382/260; 382/298
[58] Field of Search ................................ 358/296, 298, 358/443, 447, 448, 454, 456, 530, 533–536, 457; 395/102, 109, 112, 128; 382/205, 209, 210, 254, 257, 260–266, 298–300, 308

[56] References Cited

U.S. PATENT DOCUMENTS

| | | | |
|---|---|---|---|
| 4,742,553 | 5/1988 | Irwin | 382/47 |
| 4,811,108 | 3/1989 | Numakura | 358/298 |
| 4,827,353 | 5/1989 | Ehlers | 358/283 |
| 4,891,634 | 1/1990 | Ina | 340/723 |
| 4,926,267 | 5/1990 | Shu | 358/454 |
| 5,226,112 | 7/1993 | Mensing et al. | 395/114 |
| 5,265,176 | 11/1993 | Miller | 382/47 |
| 5,270,836 | 12/1993 | Kang | 358/459 |
| 5,282,057 | 1/1994 | Mailloux et al. | 358/445 |
| 5,301,037 | 4/1994 | Kang et al. | 358/451 |
| 5,359,423 | 10/1994 | Loce | 358/296 |
| 5,363,213 | 11/1994 | Coward et al. | 358/455 |
| 5,387,985 | 2/1995 | Loce et al. | 358/447 |
| 5,426,519 | 6/1995 | Banton | 358/533 |
| 5,485,289 | 1/1996 | Curry | 358/448 |
| 5,539,866 | 7/1996 | Banton et al. | 395/112 X |
| 5,579,445 | 11/1996 | Loce et al. | 395/102 |

FOREIGN PATENT DOCUMENTS

| | | | |
|---|---|---|---|
| 0622756A3 | 4/1994 | European Pat. Off. | G06K 15/00 |
| 2172169A | 9/1986 | United Kingdom | H04N 1/40 |

OTHER PUBLICATIONS

Doughherty et al; "Optimal mean-absolute-error hit-or-miss filters: morphological representation and estimation of the binary conditional expectation"; SPIE Journal of Optical Engineering, vol. 32, No. 4, Apr. 1993, pp. 815–827.

J. Potter, "A Density Preserving Digital Image Magnifier/Reducer," Xerox Disclosure Journal, vol. 4, No. 6 (Nov./Dec. 1979) pp. 805–807.

P. Papaconstantinou, "Hardware Architecture for Resolution Conversion Using Area Mapping," Xerox Disclosure Journal, vol. 18, No. 5, (Sep./Oct. 1993), pp. 553–562.

R. Coward, "Area Mapping Table Look Up Scheme," Xerox Disclosure Journal, vol. 18, No.2, Mar./Apr. 1993), pp.217–221.

R. Coward, "Area Mapping Approach for Resolution Conversion," Xerox Disclosure Journal, vol. 19, No. 2, (Mar./Apr. 1994) pp. 173–178.

Primary Examiner—Eric Frahm
Attorney, Agent, or Firm—Duane C. Basch

[57] ABSTRACT

A method and apparatus for converting the resolution of an input image to a higher resolution that is a noninteger multiple of the input resolution. The method and apparatus employ either an interlocked or noninterlocked clustering arrangement of output pixels in order to assign to each output pixel a reference value determined from the signal levels of the input image. In addition, the method and apparatus include a template-based enhancement filter to further refine modify or alter the assigned signal level prior to its output as a higher resolution image.

13 Claims, 12 Drawing Sheets

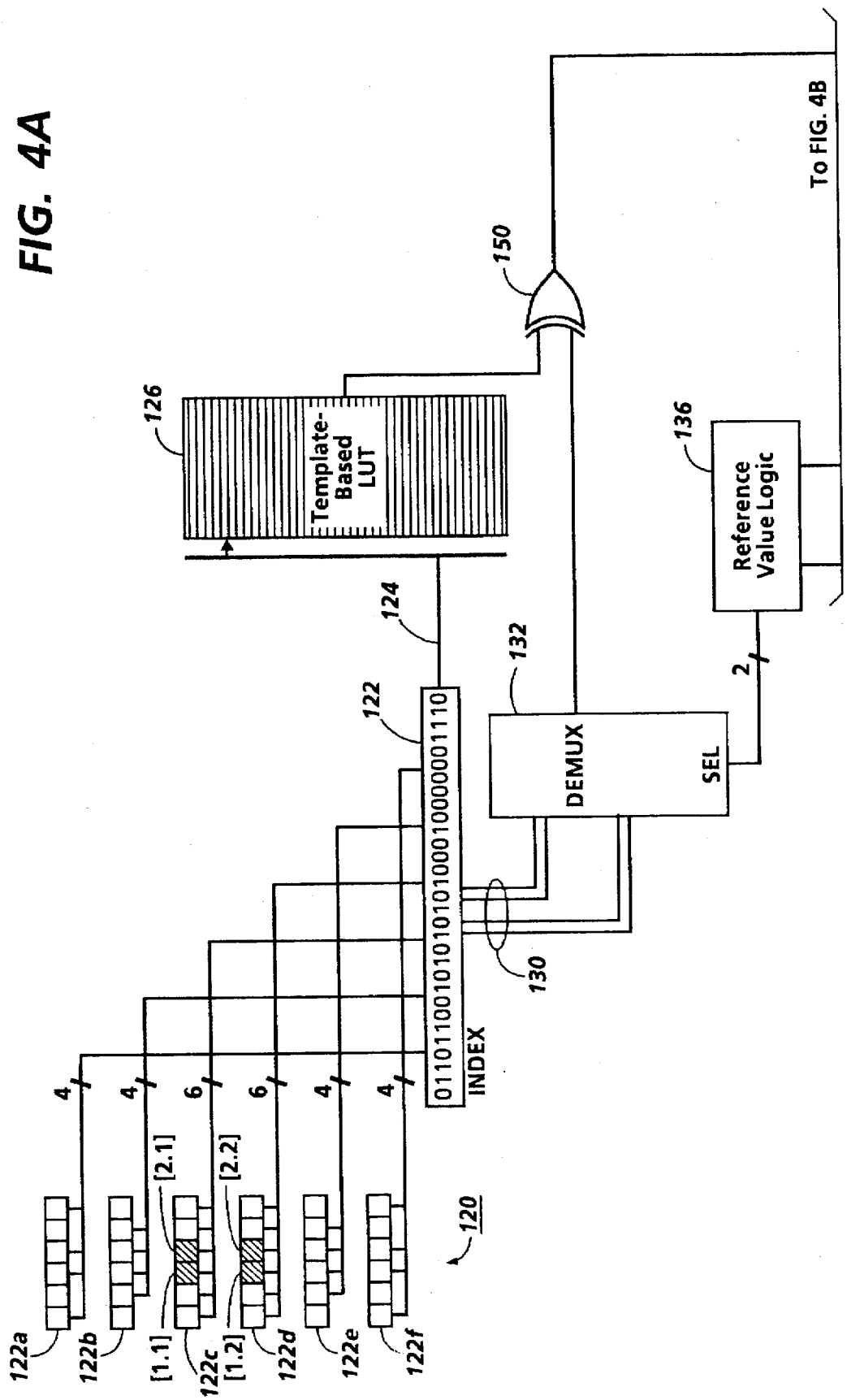

FIG. 8
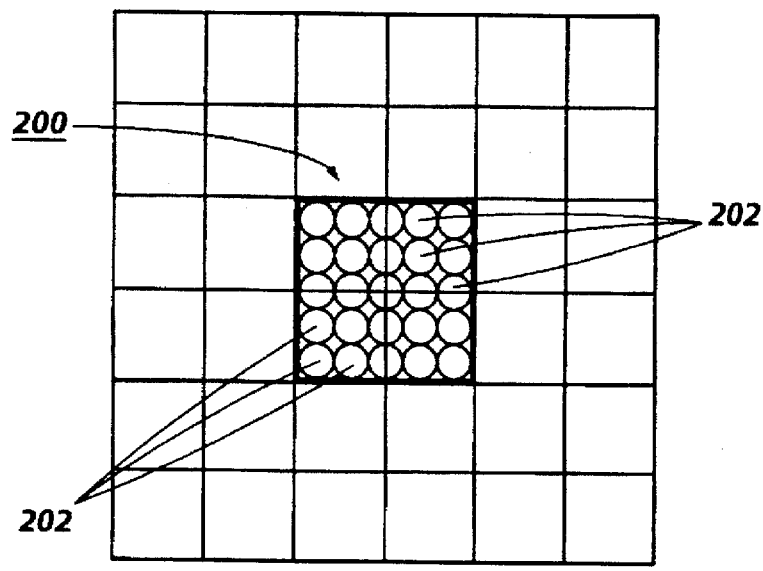
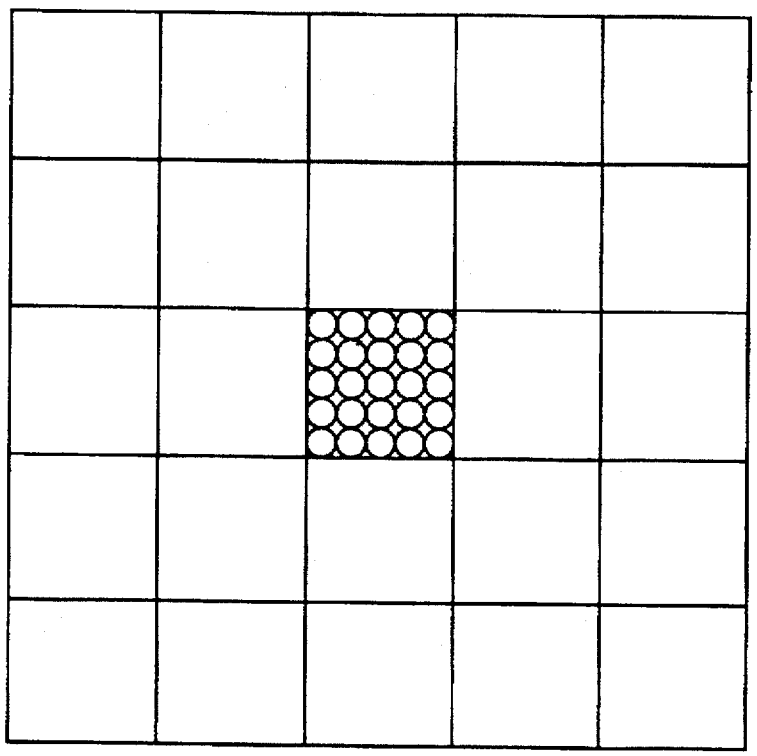
FIG. 9

AREA MAPPING EMPLOYING REFERENCE CLUSTERS FOR HIGH QUALITY NONINTEGER RESOLUTION CONVERSION WITH ENHANCEMENT

This invention relates generally to a method and apparatus for noninteger resolution conversion of image signals employing area mapping, and more particularly to the division of an input image area to be mapped into clusters prior to mapping so as to simplify the conversion and produce high quality output image signals.

CROSS REFERENCE

The following related applications are hereby incorporated by reference for their teachings:

"IMAGE RESOLUTION CONVERSION METHOD THAT EMPLOYS STATISTICALLY GENERATED MULTIPLE MORPHOLOGICAL FILTERS," R. Loce et al., application Ser. No. 08/169,487, filed Dec. 17, 1993 now U.S. Pat. No. 5,579,445.

BACKGROUND AND SUMMARY OF THE INVENTION

The present invention is employed in the processing of digital image signals, in particular to convert digital image signals at a first resolution to signals at a second resolution for high quality output on a higher resolution printing device. The general approach for non-integer resolution conversion using area mapping is to generally "map" a predefined area or region of pixels (represented by image signals) to a corresponding area at a different resolution ($M_1 \times M_2$ to $N_1 \times N_2$), where the image content of the area is best maintained, as well as the density over the area is preserved.

A problem commonly found in the traditional area mapping approaches is that halftone regions of the input image tend to be converted to regions displaying moiré (beat artifacts) and individual characters in regions of text appear jagged.

Heretofore, a number of patents and publications have disclosed the noninteger resolution conversion of image signals employing area mapping techniques, the relevant portions of which may be briefly summarized as follows:

U.S. Pat. No. 4,827,353 to Ehlers, issued May 2, 1989, discloses a method and circuit for changing the resolution of binary pseudo-halftone images. Specifically, the resolution of an image is described as being reduced by dividing the image into contiguous picture fields, where the field size is constant and a function of the reduction ratio.

U.S. Pat. No. 5,265,176 to Miller, issued Nov. 23, 1993, teaches a method and apparatus for mapping printer resolution using look-up tables. Upon computation of the resolution ratio, the horizontal component of the source data is converted to the output resolution. Subsequently, this converted data is copied to produce the vertical component of the converted data. A look-up table is employed to accomplish the mapping of the horizontal data with the method of generating the mapping template being a function of the resolution ratio.

U.S. Pat. No. 5,270,836 to Kang, issued Dec. 14, 1993, discloses a method for the conversion of bitmap images by repeated doubling of the resolution of an image and smoothing of the doubled image until an intermediate resolution is reached. Subsequently, the resolution of the intermediate resolution image is reduced using an area mapping process to produce a gray scale image that may be further processed to improve image quality.

U.S. Pat. No. 5,387,985 to Loce et al., issued Feb. 7, 1995, hereby incorporated by reference for its teachings, describes a method and apparatus for converting the resolution of a bitmap image using statistically generated templates to accomplish the non-integer conversion ratios.

In "A Density Preserving Digital Image Magnifier/Reducer," *Xerox Disclosure Journal*, Vol. 4, No. 6, (November/December 1979), pp. 805–807, J. Potter teaches an algorithm that preserves density in a reduction/magnification operation. The algorithm determines the gray level of a new pixel by a weighted averaging of the gray values of the input pixels in accordance with the amount of overlap with the output pixels.

In "Area Mapping Table Look Up Scheme," *Xerox Disclosure Journal*, Vol. 18, No. 2, (March/April 1993), pp. 217–221, R. Coward teaches a look up table technique for a resolution conversion area mapping algorithm. The input pixels within a tile, whose size is defined by the image resolution, are used to form a binary number that is then used as an index into a look up table to determine the output pixels for a particular scanline segment.

In "Hardware Architecture for Resolution Conversion Using Area Mapping," *Xerox Disclosure Journal*, Vol. 18, No. 5, (September/October 1993), pp. 553–562, P. Papaconstantinou discloses, a parallel hardware architecture for implementing area mapping for resolution conversion. The architecture employs a transformation matrix to characterize the transfer function between the input and output resolution to enable real-time resolution conversion.

In "Area Mapping Approach for Resolution Conversion," *Xerox Disclosure Journal*, Vol. 19, No. 2, (March/April 1994), pp. 173–178, H. Kang & R. Coward teaches an approach to area mapping in which the sizes of input and output pixels are allowed to differ; the size of the input and output areas being identical. To maintain optical density and image structure, a window size is first determined using the greatest common denominator between the input (M) and output (N) resolution. Next, a gray value is assigned to each output pixel, where the value is determined by a function employing a weighting factor, the input pixel values, etc. The weighting factor is predetermined as a function of the conversion ratio, the window sizes, the overlapping structures, and area coverage. The weighting factor being pre-stored in a look-up table to enable easier retrieval of the factor by a simple address based upon an output pixel's position within the window.

In accordance with the present invention, there is provided a method, operating in an image processing system, for mapping a plurality of first resolution input image signals representing a two-dimensional image to produce a plurality of second resolution image signals for rendering as a two-dimensional output image on an image output device, where the second resolution is higher than the first resolution, including the steps of:

defining a cluster of output pixel positions, wherein the cluster is a set of pixel positions having a size and two-dimensional shape encompassing a predetermined number of output pixel positions at the second resolution;

identifying a first reference value equal to an input image signal level of a reference pixel position;

setting the image signal level of the cluster of output pixels to the first reference value;

comparing image signals of a set of first resolution pixel positions within a window encompassing the reference pixel position to a template-based filter to identify a match; and modifying, ONLY in response to a template filter match, the image signal level of at least one of the first set of output pixels.

In accordance with another aspect of the present invention, there is provided an image processing system for mapping a plurality of first resolution input image signals representing a two-dimensional image to produce a plurality of second resolution image signals representing a two-dimensional output image where the second resolution is a resolution capable of being printed by an associated printer, including:

an input buffer for storing image signals, said input buffer is an array suitable for storing a predetermined number of input image signals associated with pixel positions of the first resolution;

an output image signal buffer for storing a plurality of output image signals at the second resolution;

buffer logic for controlling the storage of input image signals stored in said input buffer in association with the retrieval of output image signals from said output image signal buffer;

first reference value logic for setting a reference value equal to the input image signal level equal to that of a first pixel location stored within the input buffer and storing the reference value in memory locations corresponding to a first set of output pixels within said output image signal buffer;

a template-based filter for detecting when the input image stored in the input buffer includes an image signal pattern matching one of a plurality of predefined templates stored therein, and generating a signal upon such detection;

output pixel logic circuitry for modifying, in response to the template-based filter signal, the image signal level of at least one of the first set of output pixels in response to the detection of a template filter match.

In accordance with yet another aspect of the present invention, there is provided a method operating in an image processing system for mapping a plurality of first resolution input image signals representing a two-dimensional image to produce a plurality of second resolution image signals representing a two-dimensional output image where the second resolution is higher than the first resolution, including the steps of:

generating a template-based filter by identifying a plurality of central pixel positions within a window at the first resolution, point mapping each central pixel position to a plurality of pixel positions at a third resolution higher than the second resolution, for each pixel position of a second resolution output image, selecting one of the pixel positions of the third resolution and associating the selected pixel position to determine the image value of the second resolution pixel position, and repeating the process until each of the second resolution pixel positions is represented by a third resolution pixel position from which a reference value will be obtained;

defining a cluster of output pixel positions, wherein the cluster is a set of pixel positions having a size and two-dimensional shape encompassing a predetermined number of output pixel positions at the second resolution;

identifying a first reference value equal to an input image signal level of a reference pixel position;

setting the image signal level of the cluster of output pixels to the first reference value;

comparing image signals of a set of first dimension pixel positions within a window encompassing the reference pixel position to a template-based filter to identify a match; and modifying, ONLY in response to a template filter match, the image signal level of at least one of the first set of output pixels.

One aspect of the invention deals with a basic problem in resolution conversion techniques; the preservation of image density and structure in the output image. While various area mapping techniques are directed to similar objectives, the present invention further eliminates moiré artifacts resulting from the conversion of halftoned regions of an input image.

This aspect is further based on the discovery of a method for alleviating this problem. The technique is based upon dividing the output area into clusters of pixels, where the clusters are used to form interlocking or noninterlocking patterns to produce the high quality conversions, and in addition, to perform differencing of template filter output values with input pixel values to produce the output pixels values.

BRIEF DESCRIPTION OF THE DRAWINGS

FIGS. 4A and 4B illustrate a simplified schematic diagram of the circuitry employed to perform the image processing;

FIG. 8 is an illustration of the pixel positions of a desired output resolution image superimposed upon the pixel positions of an input resolution window;

FIG. 9 is an illustration of the pixel positions of a high resolution image, at a resolution greater than the output resolution, superimposed upon a single pixel position (point source) of an input resolution window.

Figure 1:
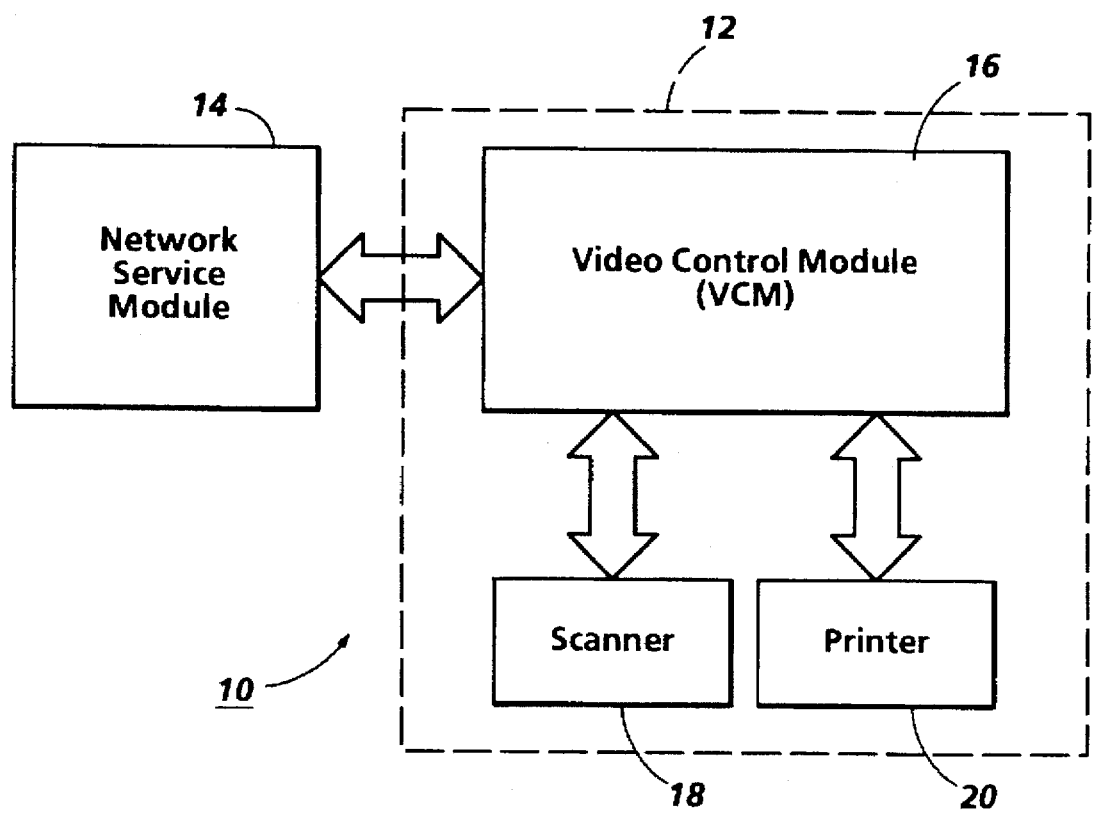
FIG. 1 is a block diagram depicting a multifunctional, networked printing machine.

The present invention will be described in connection with a preferred embodiment, however, it will be understood that there is no intent to limit the invention to the embodiment or specific image resolutions described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the present invention, reference is made to the drawings. In the drawings, like reference numerals have been used throughout to designate identical elements. In describing the present invention, the following term(s) have been used in the description.

The term "data" refers herein to physical signals that indicate or include information. When an item of data can indicate one of a number of possible alternatives, the item of data has one of a number of "values." For example, a binary item of data, also referred to as a "bit," has one of two values, interchangeably referred to as "1" and "0" or "ON" and "OFF" or "high" and "low." A bit is an "inverse" of another bit if the two bits have different values. An N-bit item of data has one of $2^N$ values.

The term "data" includes data existing in any physical form, and includes data that are transitory or are being stored or transmitted. For example, data could exist as electrical, electromagnetic or other transmitted signals or as signals stored in electronic, magnetic, or other form.

"Circuitry" or a "circuit" is any physical arrangement of matter that can respond to a first signal at one location or time by providing a second signal at another location or time. Circuitry "stores" a first signal when it receives the first signal at one time and, in response, provides substantially the same signal at another time. Circuitry "transfers" a first signal when it receives the first signal at a first location and, in response, provides substantially the same signal at a second location. An example of a circuit is a data or address bus in an electromechanical system such as a printing system or computer.

A "data storage medium" or "storage medium" is a physical medium that can store data. Examples of data storage media include magnetic media such as diskettes, floppy disks, and tape; optical media such as laser disks and CD-ROMs; and semiconductor media such as semiconductor ROMs and RAMs. As used herein, "storage medium" covers one or more distinct units of a medium that together store a body of data.

"Memory circuitry" or "memory" is any circuitry that can store data, and may include local and remote memory and input/output devices. Examples include semiconductor ROMs, RAMs, and storage medium access devices with data storage media that they can access. A "memory cell" is memory circuitry that can store a single unit of data, such as a bit or other n-ary digit or an analog value.

A "data processing system" is a physical system that processes data. An "image processing system" is a data processing system that processes image data. A "data processor" or "processor" is any component or system that can process data, and may include one or more central processing units or other processing components.

An "array of data" or "data array" or "array" is a combination of items of data that can be mapped into an array. A "two-dimensional array" is a data array whose items of data can be mapped into an array having two dimensions.

An item of data "defines" an array when it includes sufficient to obtain or produce the array. For example, an item of data defining an array may include the defined array itself, a compressed or encoded form of the defined array, a pointer to the defined array, a pointer to a part of another array from which the defined array can be obtained, or pointers to a set of smaller arrays from which the defined array can be obtained.

"Control circuitry" is circuitry that provides data or other signals that determine how other components operate. For example, "instruction circuitry" is control circuitry that provides items of data indicating instructions to a component that includes processing circuitry. Similarly, "addressing circuitry" is control circuitry that provides items of data indicating addresses to a component that includes memory circuitry.

Control circuitry provides signals that "control" transfer of data by bus circuitry if the signals determine sources and destinations of the transfers of data by the bus circuitry. For example, the control circuitry could provide signals to a source so that it provides an item of data to the bus circuitry; the control circuitry could also provide signals to one or more destinations so that they receive the item of data from the bus circuitry.

An "image" is a pattern of physical light. An image may include characters, words, and text as well as other features such as graphics. A text may be included in a set of one or more images, such as in images of the pages of a document. An image may be divided into "segments," each of which is itself an image. A segment of an image may be of any size up to and including the whole image.

An item of data "defines" an image when the item of data includes sufficient information to produce the image. For example, a two-dimensional array can define all or any part of an image, with each item of data in the array providing a value indicating the color of a respective location of the image.

Each location in an image may be called a "pixel." Hence, a "pixel" is the smallest segment into which an image is divided or accessed in a given system. In an array defining an image in which each item of data provides a value, each value indicating the color of a location may be called a "pixel value". Each pixel value is, for example, a bit in a "binary form" of an image, a gray scale value in a "gray scale form" of an image, or a set of color space coordinates in a "color coordinate form" of an image, the binary form, gray scale form, and color coordinate form each being a two-dimensional array defining an image.

An item of data "relates to" part of an image, such as a pixel or a larger segment of the image, when the item of data has a relationship of any kind to the part of the image. For example, the item of data could define the part of the image, as a pixel value defines a pixel; the item of data could be obtained from data defining the part of the image; the item of data could indicate a location of the part of the image; or the item of data could be part of a data array such that, when the data array is mapped onto the image, the item of data maps onto the part of the image.

An operation performs "image processing" when it operates on an item of data that relates to part of an image.

Pixels are "neighbors" or "neighboring" within an image when there are no other pixels between them and they meet an appropriate criterion for neighboring. If the pixels are rectangular and appear in rows and columns, each pixel may have 4 or 8 neighboring pixels, depending on the criterion used.

An "image input terminal" (IIT) or "image input device" is a device that can receive an image and produce an item of data defining a version of the image. A "scanner" is an image input device that receives an image by a scanning operation, such as by rasterizing a document;

An "image output device" (IOT) is a device that can receive an item of data defining an image and provide the image as output. A "display" and a "printer" are examples of an image output device that provides the output image in human viewable form. The visible pattern presented by a display is a "displayed image" or simply "image." The visible pattern presented by a printer is a "printed image" or simply "print" or "output."

Referring now to FIG. 1, a multifunctional printing system 10 includes a printing machine 12 operatively coupled with a network service module 14. The printing machine 12 includes an electronic subsystem 16, referred to as a video control module (VCM), communicating with a scanner 18 and a printer 20. In one example, the VCM 16 coordinates the operation of the scanner and printer in a digital copying arrangement. In a digital copying arrangement, the scanner 18 (or IIT) reads an image on an original document using a linear scanning array (e.g., a charge-coupled device (CCD)) and converts analog video signals, as gathered by the array, into a linear series of digital signals or rasters. In turn, an image processing system 22 (FIG. 2), associated with scanner 18, executes signal correction and the like, converts the corrected signals into binary signals, and optionally compresses the multi-level signals and preferably stores the same in electronic precollation (EPC) memory 24. Although described hereafter with respect to the multifunctional printing system of FIG. 1, it will be appreciated that the present invention has application in any printing system suitable for receiving images from a plurality of sources at resolutions other than those at which it prints. For instance, the present invention may be incorporated within the electroreprographic machine described in detail by Kang et al. in U.S. Pat. No. 5,301,037, issued Apr. 5, 1994, and hereby incorporated by reference for its teachings.

Printer 20 (IOT) preferably includes a xerographic print engine. In one example, the print engine has a multi-pitch photoreceptor belt (not shown) which is written on with an exposure source, such as a synchronous source (e.g. laser raster output scanning device) or an asynchronous source (e.g. LED print bar). In a printing context, the multi-level image data is read out of the EPC memory 24 (FIG. 2) while the exposure source is modulated in accordance with the image data, forming a latent image on the photoreceptor belt. Subsequently, the latent image is developed using any number of known development techniques and transferred to a print media sheet. Upon fusing the resulting print, it may be inverted for duplexing or simply output. It will be appreciated by those skilled in the art that the printer can include numerous alternative marking engines besides a xerographic print engine without altering the concept upon which the disclosed embodiment is based. For example, the printing system 10 could be implemented with a thermal ink jet or ionographic printer.

Figure 2:
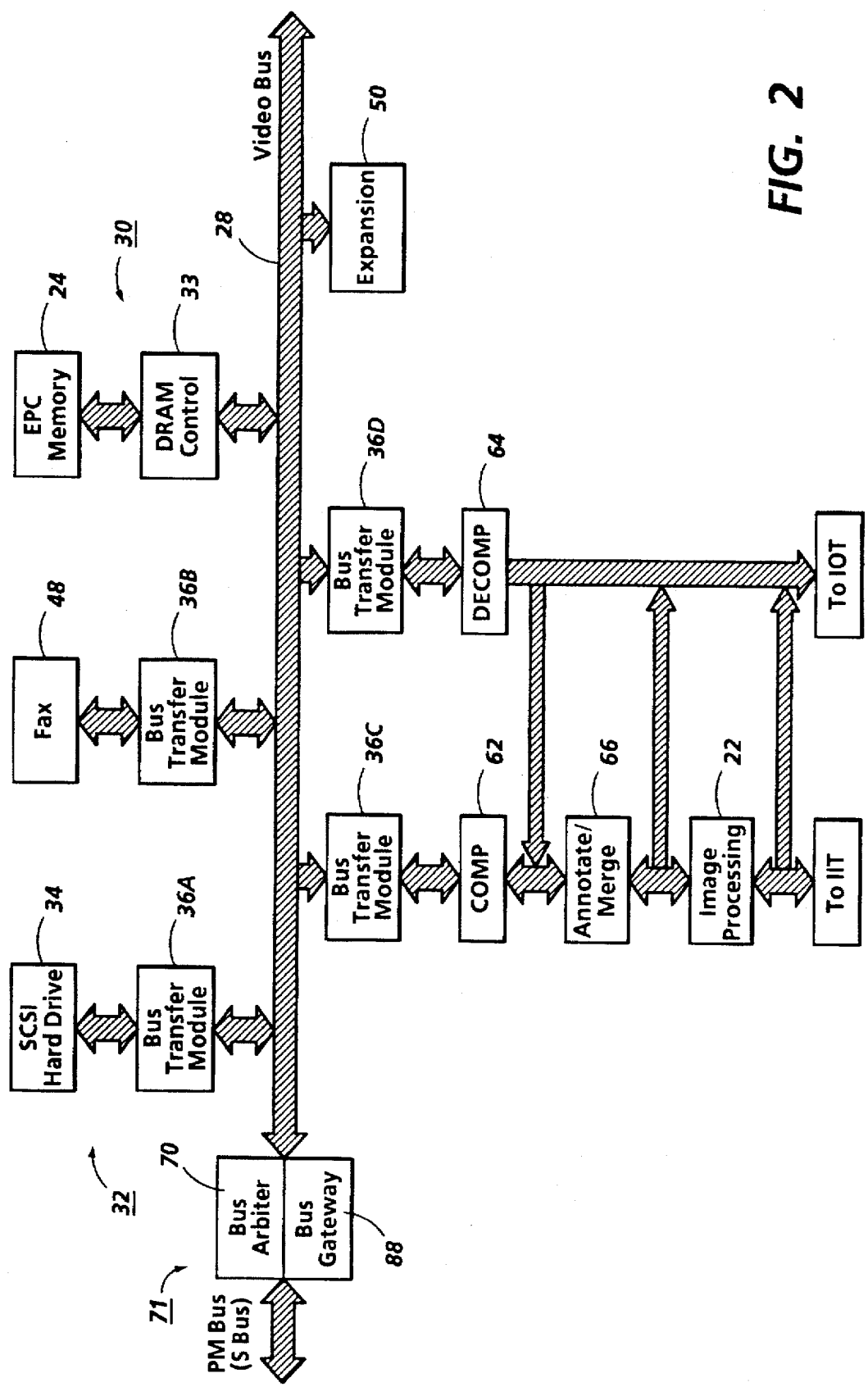
FIG. 2 is a block diagram of a video control module for the printing machine of FIG. 1.

Referring specifically to FIG. 2, VCM 16 includes a video bus 28 with which various I/O, data transfer and data storage media communicate. Preferably, video bus 28 is a high speed, 32 bit (expandable to 64) data burst transfer bus having a sustainable bandwidth of up to approximately 60 MBytes/sec. The data storage media of the VCM reside in storage devices; EPC memory section 30 and mass memory section 32. The EPC memory section includes EPC memory 24, preferably DRAM, coupled to the video bus by way of a DRAM controller 33. Mass memory section 32 includes a SCSI hard drive 34 coupled to the video bus by transfer module 36a. Other I/O and processing components may coupled respectively to the video bus by transfer modules 36. It will be appreciated that other devices (e.g. a workstation) could be coupled to the video bus.

Referring to FIGS. 1 and 2, three I/O components are shown as being operatively coupled to video bus 28; (1) facsimile (FAX) module 48, (2) scanner or IIT 18, and (3) the printer or IOT 20. Furthermore a wide variety of components could be coupled to the video bus by expansion slot 50. In one embodiment of FAX module 48, the module would include a chain of components, namely a section for performing Xerox adaptive compression/decompression, a section for scaling compressed image data, a section for converting compressed image data to or from CCITT format, and a modem for transmitting CCITT formatted data from or to a telephone connection, by way of a conventional communication line.

Referring again to FIG. 2, the IIT 18 and IOT 20 are operatively coupled to the video bus 28 by transfer modules 36c and 36d. Additionally, the IIT 18 and the IOT 20 are operatively coupled with a compressor 62 and a decompressor 64, respectively. The compressor and decompressor are preferably provided by a single module that employs Xerox adaptive compression devices. Xerox adaptive compression devices have been used for compression/decompression operations by Xerox Corporation, for example in its DocuTech® printing system.

As further illustrated by FIG. 2, the scanner 18, which includes the image processing section 22, may be coupled with an annotate/merge module 66. Preferably the image processing section includes one or more dedicated processors programmed to perform various desired functions, such as image enhancement, thresholding/screening, rotation, resolution conversion and TRC adjustment. The selective activation of one or more of these functions can be coordinated by a group of image processing control registers, the registers being programmed by a system controller (not shown). Preferably, the functions are arranged along a "pipeline" in which image data is input to one end of the pipe, and processed image data is output from the other end of the "pipe." As will be described hereafter, the resolution conversion operations of the present invention are preferably accomplished within image processing section 22.

Referring still to FIG. 2, arbitration of the various bus masters of the VCM 16 is implemented by way of a video bus arbiter 70 disposed in a video bus arbiter/bus gateway 71. The arbiter determines which bus master (e.g. FAX module, Scanner, Printer, SCSI Hard Drive, EPC Memory or Network Service Component) can access the video bus at one given time.

Referring again to FIG. 1, the architecture of the network service module is similar to that of a personal computer. More particularly, a controller (not shown), is coupled with a standard SBus 72. In one example, the network interface includes all of the hardware and software necessary to relate the hardware/software components of the controller with the hardware/software components of a network. For instance, to interface various protocols between the network service module 14 and the network, the network interface could be provided with, among other software, Netware® from Novell Corp. In operation, a user may generate a job including a plurality of electronic pages and a set of processing instructions. In turn, the job is converted into a representation written in a page description language, such as PostScript. The job is then transmitted to the controller where it is interpreted with a decomposer, such as one provided by Adobe Corporation. (See, for example, U.S. Pat. No. 5,226, 112 to Mensing et al.)

Referring again to FIG. 2, network service module 14 is coupled with VCM 16 via a bus gateway 88 of the video bus arbiter/bus gateway 71. In one example, the bus gateway may comprise a field programmable gate array (FPGA). The bus gateway provides the interface between the host SBus and the VCM video bus. It provides video bus address translation for accesses to address spaces in the video bus real address range, and passes a virtual address to the host SBus for virtual addresses in the host address range. A DMA channel for memory to memory transfers is also implemented in the bus gateway. Among other things, the bus gateway provides seamless access between the video bus and SBus, and decodes virtual addresses from bus masters, such as one of the transfer modules 36, so that an identifier can be obtained from a corresponding slave component. It will be appreciated by those skilled in the art that many components of the printing system 10 are implemented in the form of a single application specific integrated circuit (ASIC).

Figure 3:
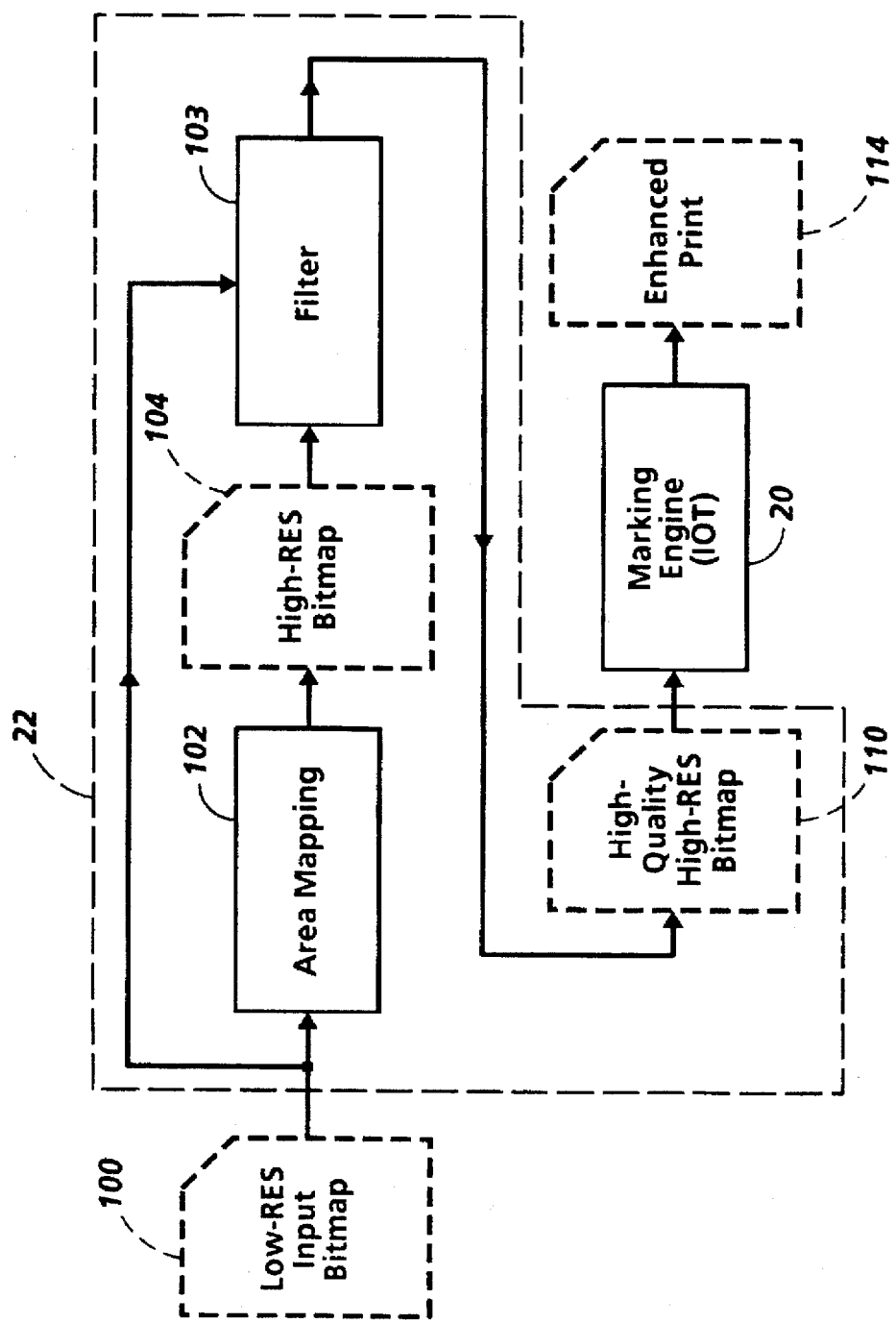
FIG. 3 is a diagram of the flow of data through the various stages of the image processing block of FIG. 2.
Figure 4B:
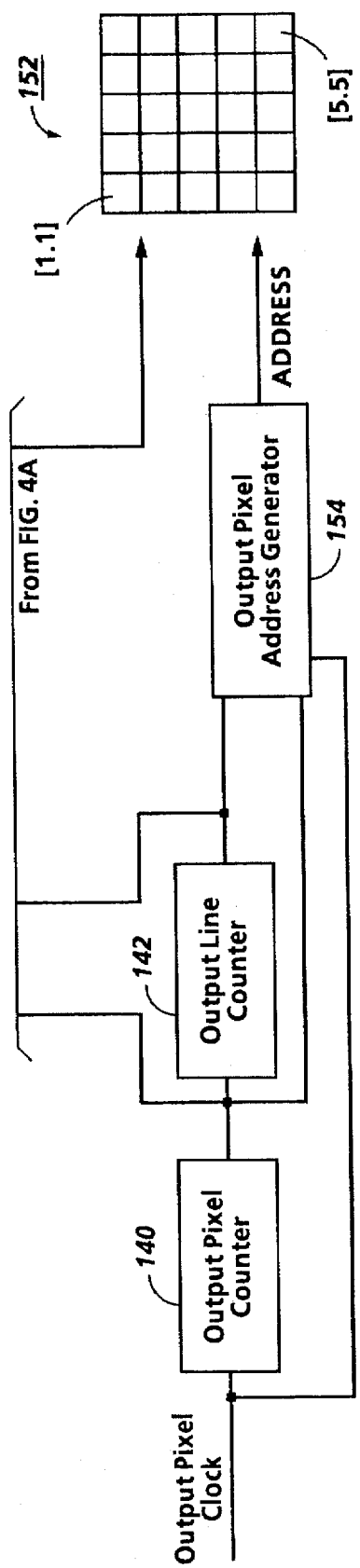

Referring to FIGS. 2 and 3, printing system 12 includes an image processing section for performing such operations as resolution conversion, either of scanned images or of video image data transferred via the video bus. Preferably, the image pixel data is represented by a plurality of image signals, and image processor 22 serves to divide such data into windows of image signals for conversion using an area mapping technique. In particular, FIG. 3 illustrates the various steps in the resolution conversion process. It is noted that while the process is depicted in FIG. 3 as a serial process, where each step occurs in seriatim, that is not the case in a preferred hardware embodiment such as depicted in FIGS. 4A and 4B. The serial representation has been illustrated primarily for purposes of explanation of the process, whereas the hardware embodiment is preferred to improve throughput of the video data.

As shown in FIGS. 4A and 4B, low-resolution input bitmap 100, comprising an image segment at an input resolution M is provided to image processor 22 (FIG. 2). Initially, the image segment, preferably consisting of a plurality of digital image signals, undergoes an area mapping operation, block 102, to produce more than one image signal for each corresponding input image signal. The output of the area mapping operation is a high resolution bitmap 104 comprising a plurality of image signals. The number of output signals produced for each input image signal is determined as a function of the conversion ratio $N_1 \times N_2 / M_1 \times M_2$, where $N_1$ and $N_2$ are the cross-process and with-process resolutions of the output image, respectively and are respectively greater than $M_1$ and $M_2$, which are the resolutions of the input image. Often the resolutions are the same in the two directions and the input is simply referred to as having resolution M and the output having resolution N. For example, in a conversion of a 240×240 spi (spots/inch) input image (M=240) to a 600×600 spi output image (N=600), the conversion ratio is 5-to-2 in each direction, representing a noninteger conversion. The ratio o/output to input pixels is 5×5/2×2=25/4. To properly preserve image density, each input pixel should be the reference for approximately six output pixels. To best maintain image structure and preserve local density, the six (approximately) pixels should be clustered, or grouped in a manner that, on the average, best represent the input pixels.

Once the high-resolution image bitmap is created at area mapping block 102, the filter of block 108 is applied to enhance the resulting image segment. In a preferred embodiment, filter 108 is accomplished using a template-based filter generated using statistical techniques or equivalent methods as will be described hereafter. Operating on the image signals of bitmap 104, filter 108 selectively alters or modifies the image signals as a function of patterns found in the lower resolution input image 100. The result of the filter operation performed at block 108 is a high-quality, high-resolution bitmap image 110 that may then be passed from the image processor 22 to a marking engine or IOT 20 as previously described. The IOT then renders the bitmap image on a print media at resolution N to produce print 114 in a human readable form.

Referring now to FIGS. 4A and 4B in conjunction with FIG. 3, an exemplary hardware embodiment in accordance with the present invention will be described. FIGS. 4A and 4B illustrate the principal hardware components necessary to implement the present invention, for example, resolution conversion of 240×240 spi to 600×600 spi. The invention, however, is not intended to be limited to these resolutions and may be applied to accomplish other conversion ratios as well. Input buffer 120 is a data storage buffer comprising a plurality of serial-in, parallel-out registers 122 (122a–f). In operation, buffer 120 receives image signals from the video bus or IIT and places a segment thereof into the various registers in a serial fashion, where each register holds a number of image signals from a "vertical" section of six adjacent image rasters. In other words, the input buffer contains image signals from a 6 pixel by 6 pixel segment of the input image. However, the data stored in the buffer is employed only to produce output pixels associated with the four input pixel locations found in the center of the buffer or window, the central input pixels.

Figure 5:
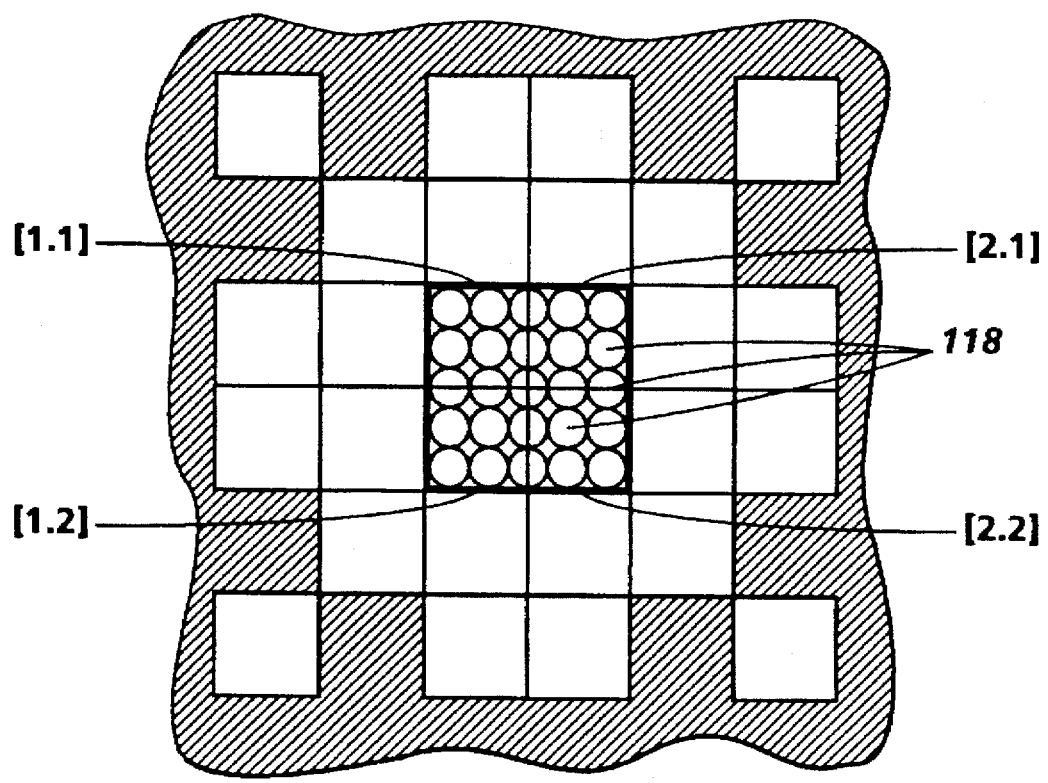
FIG. 5 is an illustration of an exemplary input pixel window.

As illustrated by FIG. 5, the four central input pixels, 1.1, 1.2, 2.1 and 2.2 are to be resolution converted to produce twenty-five output pixels (an N/M conversion ratio of 5-to-2 in each direction) indicated, for example, by reference numeral 118 superimposed upon the central input pixels. FIG. 5 also depicts the input pixel positions selected from the buffer or window for template comparison. In the illustrated embodiment, from the thirty-six possible pixel positions, image signals from twenty-eight of those positions are employed for the filtering operation as will be described in conjunction with FIGS. 4A and 4B. Fewer pixels may be used should there be hardware constraints limiting the buffer or window to a more manageable size, e.g., 24 bits used for a 24 pixel window. However, the general rule is that the larger number of pixels in the window the better the results achieved.

As previously noted, the input buffer 120 contains image signals for a plurality of pixels. Once stored, certain of the signals are propagated to index buffer 122. In particular, the stored signals are placed in the index buffer in a predetermined scheme or order so as to produce a 28-bit index value as illustrated. The manner in which the image signals are selected from buffer 120 and propagated to index buffer 122 is in accordance with the buffer illustrated in detail in FIG. 5. For example, for the uppermost raster data only four image signals are propagated, pixels 1, 3, 4 and 6, respectively in left-to-right order. This preferred selection scheme is further illustrated by the line connections of FIG. 4A, where pixels are selected from each of the six raster segments stored in buffer 120.

After the selected image signals are stored in index buffer 122, the 28-bit index value is passed on address line 124 to generate an index to a memory location within LUT 126. Concurrently the image signals corresponding to the four central pixel positions (1.1, 2.1, 1.2 and 2.2) are passed on individual conductors 130 to the input of demultiplexer (DEMUX) 132. The selection of one of the image signals for output from DEMUX 132 is accomplished by selection signals output from the reference value logic circuitry 136.

Figure 6:
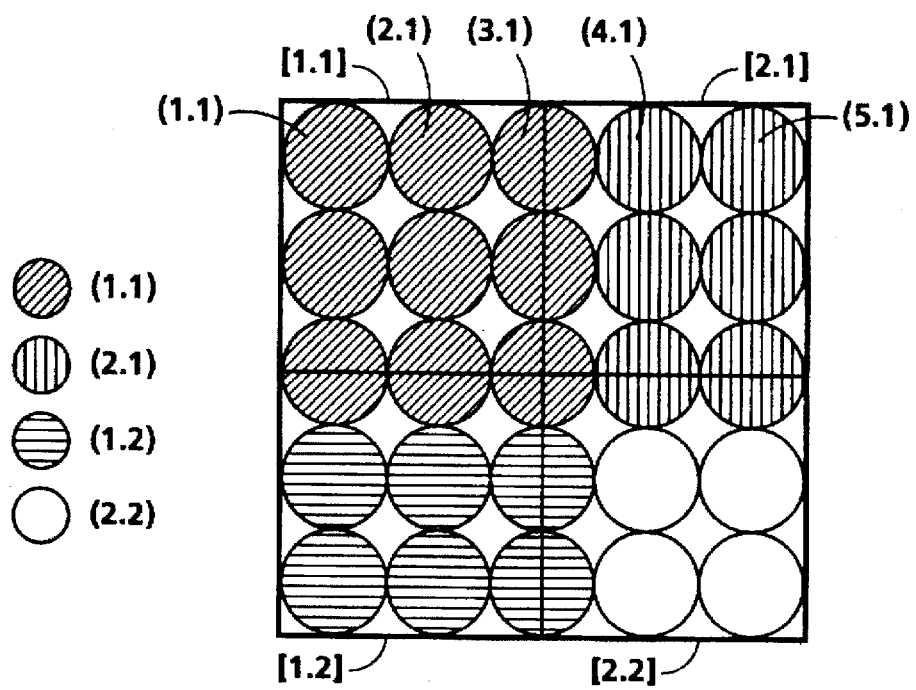
FIGS. 6 and 7 respectively illustrate noninterlocked and interlocked output pixel clustering arrangements in accordance with the present invention.

Reference value logic circuit 136 is designed to output a pair of selection signals based upon the output pixel position of an image signal being processed. Referring, for example, to FIG. 6, where a noninterlocked output cluster map is illustrated, it may be observed that the reference value for input pixel 1.1 (indicated as [1.1]) is employed as the reference or default output value for output pixel positions 1.1, 2.1, 3.1, 1.2, 2.2, 3.2, 1.3, 2.3 and 3.3. Similar assignments of input image signals as the reference value are employed for the remaining output pixel positions as illustrated in FIG. 6. Upon receiving signals from the pixel and line counters, 140 and 142 respectively, the reference value logic circuitry generates the appropriate select signals to allow DEMUX 132 to output the image signal on line 144. As an example, the image signal associated with input pixel position [1.1] would be selected, according to the noninterlocked cluster of FIG. 6, whenever the pixel and line counters both exhibited counts equal to three or less (assuming the counters initialize at 1). Similarly, the image signal for input pixel position [2.2] would be output from DEMUX 132 as the reference value whenever the counts of both counters 140 and 142 were four or more. Thus, reference value logic will select the reference value for output in accordance with the position of the output pixel for which a signal is to be determined.

At the same time, the output of a template-based filter within LUT 126 is generated. The template-based filter detects a specific pattern of image signals within the input image segment stored in buffer 120. Upon detection of the predetermined pattern the LUT filter outputs a binary value 1, and otherwise it outputs a value 0. It will be appreciated by those skilled in the art of digital design that a number of logic schemes may be employed in the implementation of the look-up table. For example, LUT 126 may be implemented as a plurality of look-up tables (e.g., twenty-five), each outputting a single bit, one of which is sequentially selected for each output pixel address. Alternatively, a much larger look-up table may be employed with an input consisting of not only the pattern but the output pixel address to then repeatedly output image signals as the address of the output pixel changes. However, for purposes of simplifying the description herein a single-bit output LUT is discussed. Thus, whenever a predefined template pattern is detected, as the result of the index value used to address the look-up table, the output of LUT 126 will be a 1. The output of LUT 126 is then passed to the input of XOR 150 where it is XORed with the reference value output from DEMUX 132. The outcome of the XOR logic operation is such that whenever the LUT outputs a binary 0 the reference value is stored in output image signal buffer 152 and whenever the LUT output is a binary 1, the reference signal is inverted before being stored in the output buffer.

In yet another alternative embodiment, the LUT filter may be accomplished using twenty-one 24-bit-in, one-bit-out look-up tables to generate twenty-one of twenty-five output pixels. The output values for the remaining four pixels are then taken directly from the associated input pixels. To accomplish the twenty-one look-up tables, a total of three FPGA's may be employed, seven look-up tables in each, where each FPGA is able to hold approximately 1100 logic reduced templates.

As represented by output address generator 154, the location within output buffer 152 at which the binary result from XOR 150 is stored is determined as a function of the pixel and line clock counts, counters 140 and 142 respectively. As will be appreciated by those skilled in the art, the aforedescribed process (FIG. 3), performed on the apparatus illustrated schematically in FIGS. 4A and 4B, is intended to be repeated for successive input pixels within an input image segment, or an entire image, until all input pixel locations have fallen within a central pixel position of the input buffer, thereby completely converting each input pixel signal into a plurality of output pixel signals to produce a higher resolution output image.

It will be further appreciated by those skilled in the art, as previously described by Loce et al. in E. R. Dougherty, R. P. Loce, "Optimal Mean-Absolute-Error Hit-or-Miss Filters: Morphological Representation and Estimation of the Binary Conditional Expectation," *SPIE Journal of Optical Engineering*, Vol. 32, No. 4, pp. 815–827, April 1993, that it is possible to reduce the number of templates that must be stored in LUT so that there is no need to have $2^{28}$ possible addresses therein (note $2^{28}$ is for the exemplary case). Moreover, the logic associated with one or more of the counters, demultiplexer, reference value logic or look-up table may be implemented using conventional design simplifying components such as gate arrays, field programmable gate arrays or even application specific integrated circuits. A notable advantage of such components is not only a cost reduction when produced in large quantities but an associated improvement in image signal bandwidth.

Figure 7:
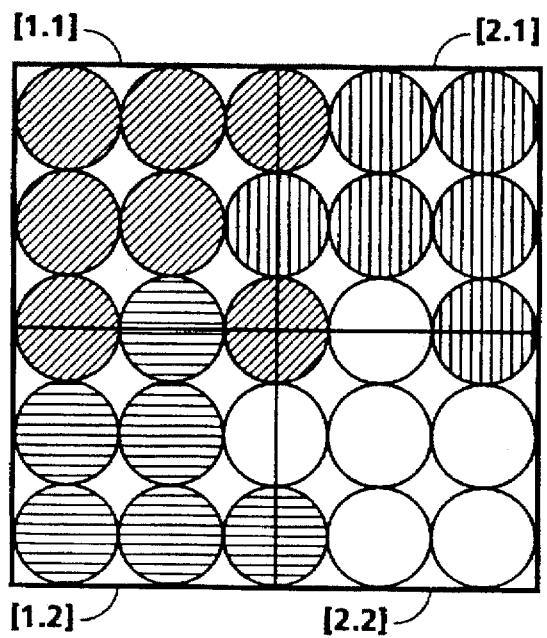
Figure 10A:
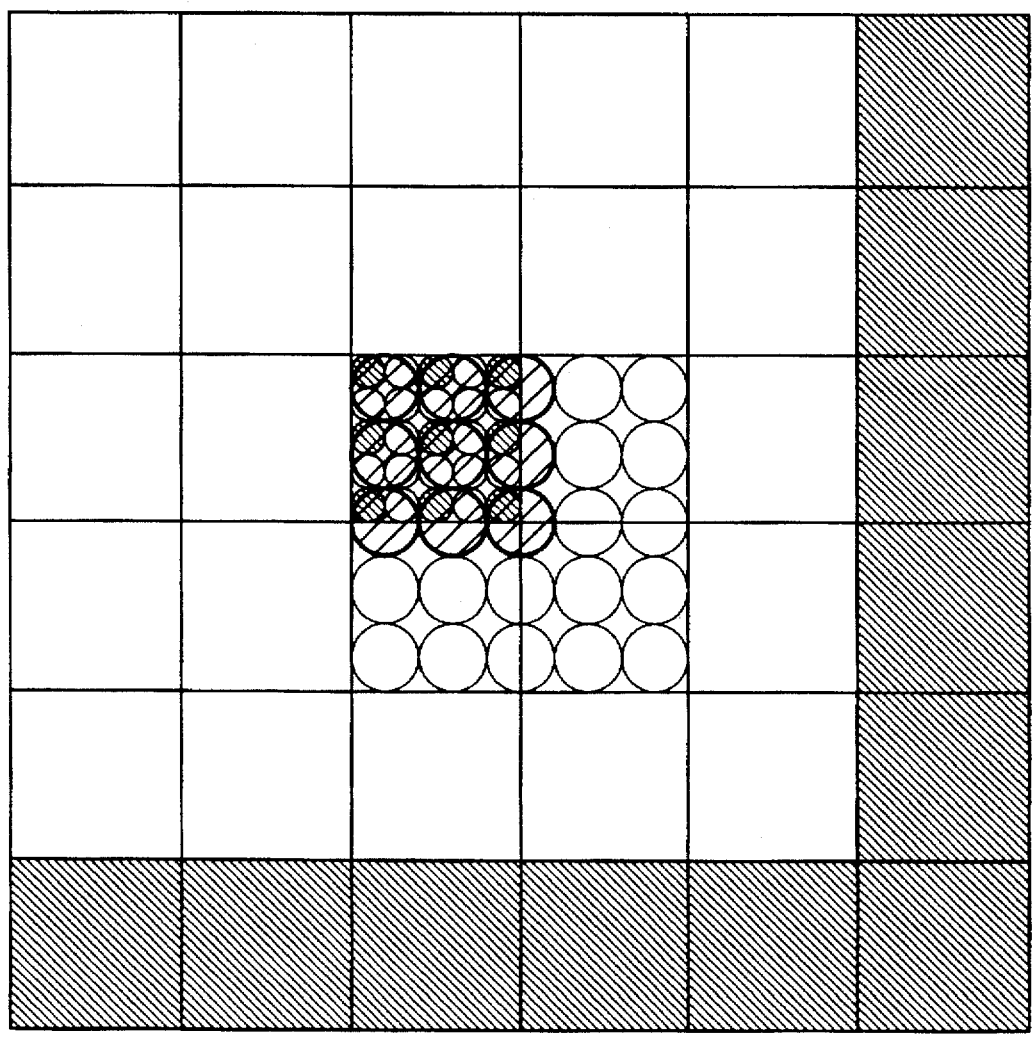
FIGS. 10A–10D are illustrations of the four possible positions of a point source window, as illustrated in FIG. 9, superimposed upon the input resolution window of FIG. 8 in accordance with one aspect of the present invention.
Figure 10B:
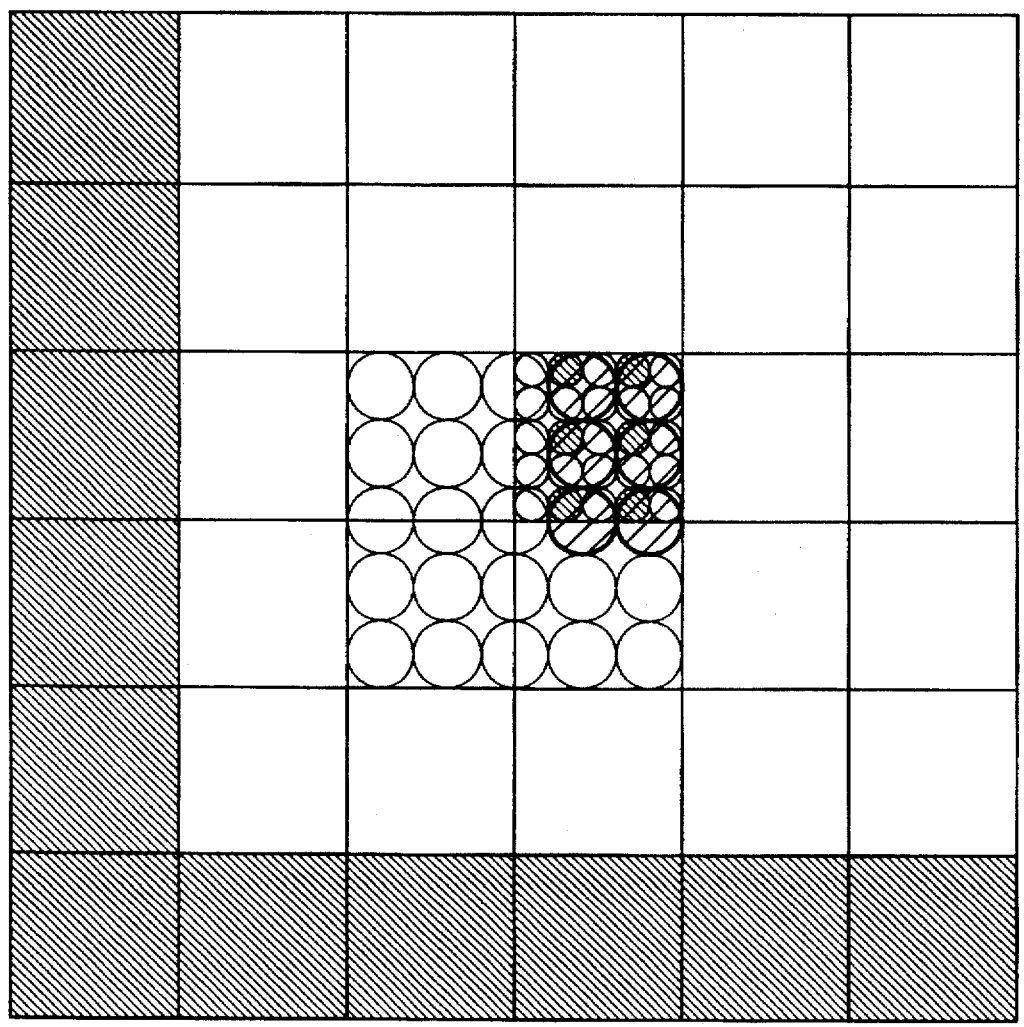
Figure 10C:
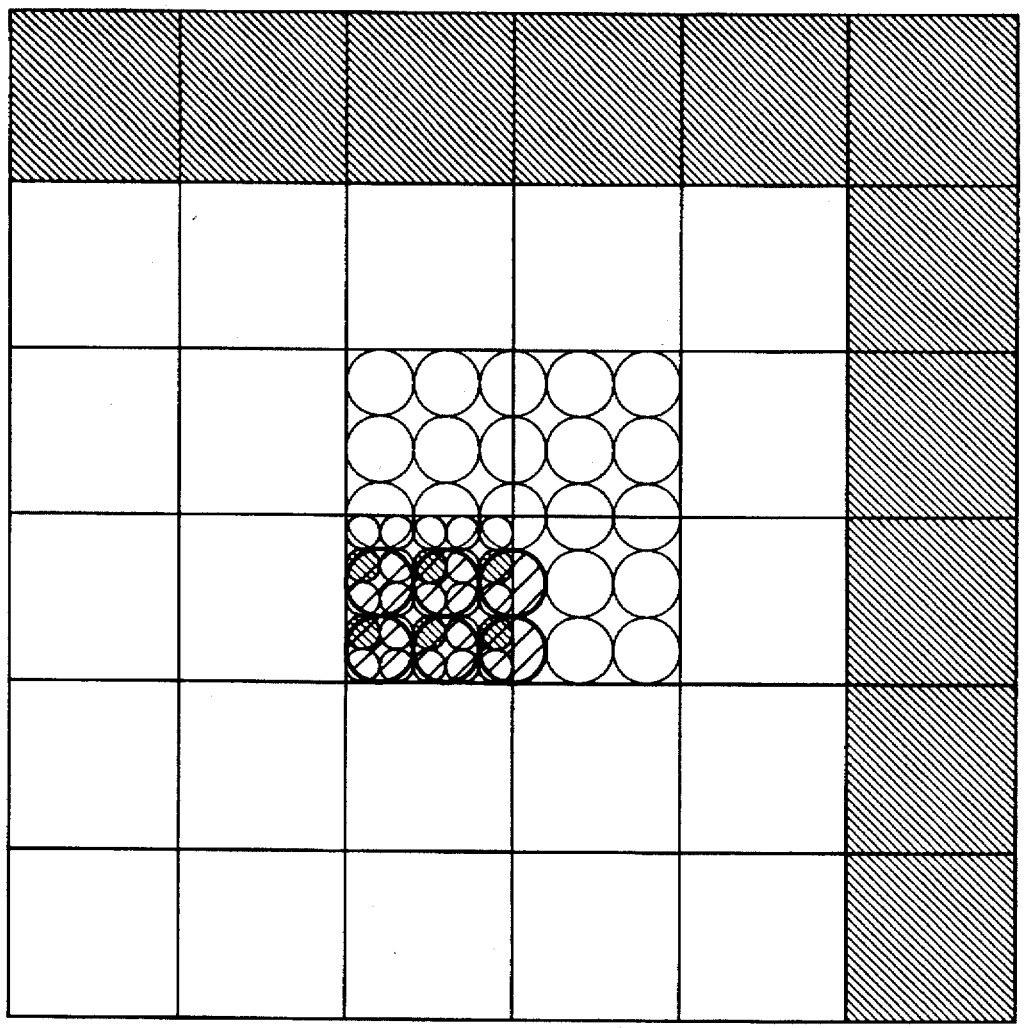
Figure 10D:
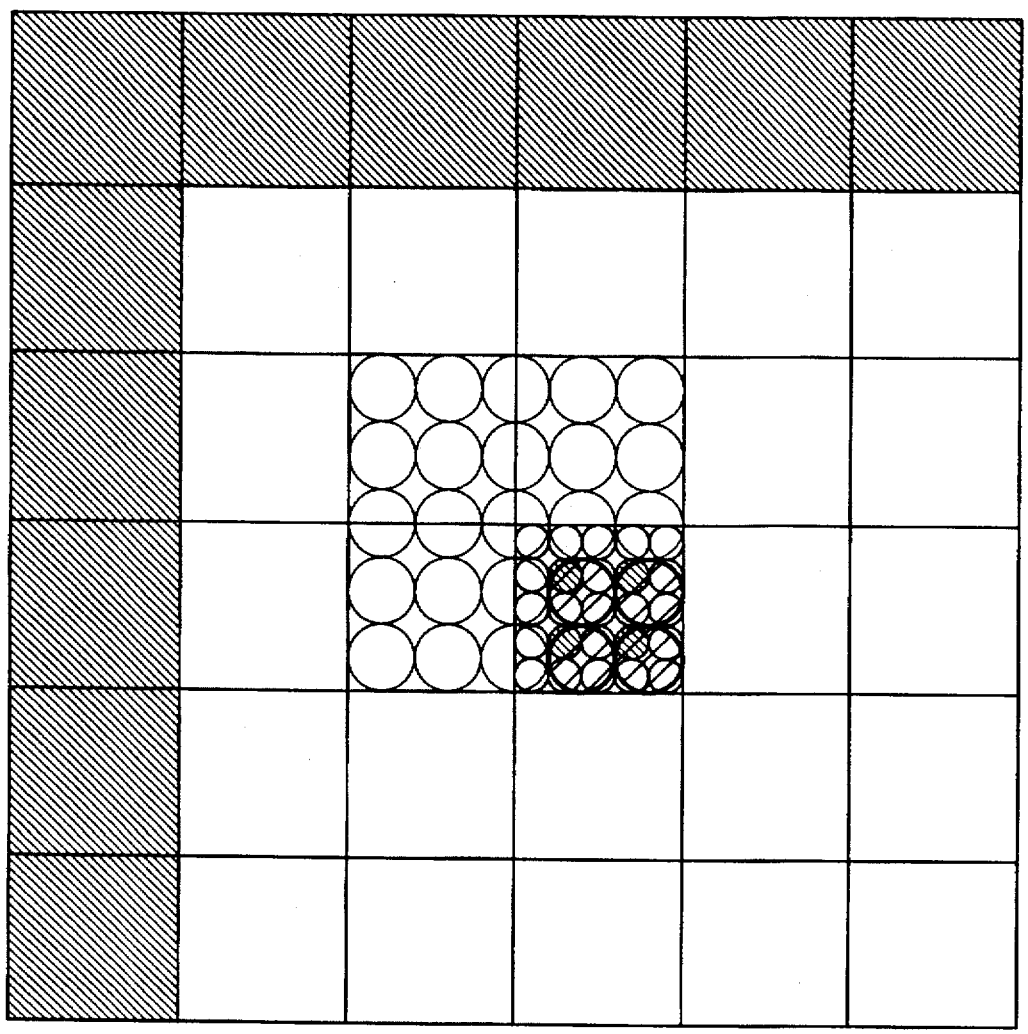

Referring now to FIG. 7, shown therein is an alternative to the noninterlocked clustering of output pixels illustrated in FIG. 6. In particular, FIG. 7 depicts an interlocked clustering arrangement where the reference value associated with particular output pixel locations is chosen so as to eliminate the likelihood of visible moiré (beating) in the output print, and edge position errors particularly along the input pixel boundaries. Comparing FIGS. 6 and 7, for example, it is apparent that the regular (straight) boundary between output pixels of different levels is not an aspect of the cluster of FIG. 7. FIG. 7, referred to as an interlocked cluster, is purposely designed to eliminate the likelihood of the introduction of human perceivable structure in an output print. Essentially, interlocked clustering (FIG. 7) produces a type of half-bitting along the split pixels in an output image that prevents line width and dot width variations between the input and output images at M and N resolutions, respectively. Furthermore, the halftones and tints in the output image may be resolution converted without introducing beats. Whereas the noninterlocking cluster scheme is similar to the pixel grouping that would be employed in nearest neighbor interpolation methods (alternate between bit-double and bit-triple, line-double, line-triple for the example demonstrating 240 spi the 600 spi conversion), the interlocked clustering method attempts to preserve local density, edge positions, and stroke width. To design an interlocked cluster mapping, first the ratio of input and output pixels is determined (approximately six output pixels for each input pixel in the present embodiment). Then clusters of pixels are formed that employ the same reference value. When input and output pixel boundaries are not coincident (as in the center line of the mapping zone of the present example) the output pixels along that boundary are assigned alternately from the neighboring underlying pixels. The alternating reference clusters form half-bit structures when edges lie on the noncoincident boundary in an input image. The half bit structures can physically blur in the printing, display, or viewing processes to give the appearance that the output and input edge are positioned in the same location. Actually, the average output edge is in the same position as the input edge.

Design of the template-based look-up tables employed in accordance with the present invention may be accomplished using the statistical, training document design techniques described in the patent application for an "IMAGE RESOLUTION CONVERSION METHOD THAT EMPLOYS STATISTICALLY GENERATED MULTIPLE MORPHOLOGICAL FILTERS," by Robert P. Loce, Michael S. Cianciosi, and Jeffrey D. Kingsley, application Ser. No. 08/169,487 (filed Dec. 17, 1993) now U.S. Pat. No. 5,579,445. A degree of complexity is added to the look-up table design method. In the referenced application, the design methods were all described as mapping a single pixel to a collection of pixels. Conversely, the present invention maps an input group or area of pixels to an output group. Sample-phase design methods similar to those disclosed in application Ser. No. 08/169,487 could be employed in the present case, but the sample phases and window stepping would be altered in a relatively straightforward manner. (Note that in the following discussion mapping a single pixel to a group of pixels is referred to as a point mapping.) Alternatively, the look-up table filters may be designed using a higher-resolution integer ratio mapping, as described in the referenced application above, followed by a redefinition to achieve an area mapping filter.

Referring to FIGS. 8, 9 and 10A–10D, the alternative design technique will be described. In the example, a 240×240 spi input document is to be converted to a 600×600 spi output document as illustrated by FIG. 8. As described previously, the four central pixels of input window 200 are resolution converted to produce twenty-five output image pixels as indicated by reference numeral 202. To design a filter and associated reference pixels to complete the invention as previously described each of the four central input pixels is point mapped to a series of twenty-five pixels, as illustrated by FIG. 9. Essentially, this accomplishes a 240×240 spi to 1200×1200 spi conversion. Recognizing that the point-mapped pixels of the 1200×1200 spi representation may then be overlaid on the desired pixel positions of the 600×600 spi output, as illustrated for example by FIG. 10A, individual pixels in the point mapped output may be selected as being representative of associated pixels in the desired area mapped representation of 600×600 spi. In other words, one of the 1200×1200 spi pixels lying within a 600 spi pixel may be used to represent the full 600×600 spi pixel. In addition, because the 5×5 window of FIG. 9 fits within one of four possible positions of the 6×6 window (as illustrated by FIGS. 10a–10D), the overall filter may be characterized as a 6×6 area mapping filter, composed of a plurality of 5×5 point mapping filters.

In recapitulation, the present invention is a method and apparatus for converting the resolution of an input image to a higher resolution that is a noninteger multiple of the input resolution. The invention employs either an interlocked or noninterlocked clustering arrangement of output pixels in order to assign to each output pixel a reference value determined from the signal levels of the input image. In addition, the invention includes a template-based enhancement filter to further refine modify or alter the assigned signal level prior to its output as a higher resolution image.

It is, therefore, apparent that there has been provided, in accordance with the present invention, a method and apparatus for converting the resolution of an input image into a higher resolution output image in a manner suitable for preserving image density while avoiding the introduction of artifacts by the conversion process. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

We claim:

1. A method, operating in an image processing system, for mapping a plurality of first resolution input image signals representing a two-dimensional image to produce a plurality of second resolution image signals for rendering as a two-dimensional output image on an image output device, where the second resolution is higher than the first resolution, including the steps of:

defining a cluster of output pixel positions, wherein the cluster is a set of pixel positions having a size and two-dimensional shape encompassing a predetermined number of output pixel positions at the second resolution;

identifying a first reference value equal to an input image signal level of a reference pixel position;

setting the image signal level of the cluster of output pixels to the first reference value;

comparing image signals of a set of first dimension pixel positions within a window encompassing the reference pixel position to a template-based filter to identify a match; and modifying, only in response to a template-based filter match, the image signal level of at least one of the cluster of output pixels.

2. The method of claim 1, further including the steps of:

defining a second cluster of output pixel positions, wherein the second cluster is a set of pixel positions having a size and two-dimensional shape encompassing a predetermined number of pixel positions at the second resolution;

identifying a second reference value equal to an input image signal level of a second reference pixel position;

setting the image signal level of the second cluster of output pixels to the second reference value;

comparing image signals of a set of first dimension pixel positions within a window encompassing the second reference pixel position to a template-based filter to identify a match; and modifying, only in response to a template filter match, the image signal level of at least one of the second set of output pixels.

3. The method of claim 2, wherein the first and second sets of output pixels are interlocked.

4. The method of claim 2, wherein the second resolution is a non-integer multiple of the first resolution.

5. The method of claim 4, wherein edges present in the input and output images may not be aligned coincidently in their respective images due to the non-integer resolution mapping and where the first and second sets of output pixels are interlocked by alternately activating the neighboring pixels to give the appearance in the two-dimensional output image that edges within the input image are similarly positioned in the output image.

6. The method of claim 1, wherein the output cluster and the reference pixel position respectively represent associated regions of the first and second resolution images.

7. The method of claim 6, wherein the the reference pixel position is selected so as to correspond with an overlap of the pixel positions of the second resolution image when the second resolution image is superimposed over the first resolution image.

8. The method of claim 1, wherein the first resolution is 240×240 spi and the second resolution is 600×600 spi, and where a 2×2 array of input image signals are converted to a corresponding 5×5 array of output image signals, and where the first reference signal is determined by the image signal contained in a first quadrant of the 2×2 array of input image signals, further including the steps of:

defining second, third and forth clusters of output pixel positions, wherein the second, third and forth clusters, in combination with the first cluster, comprise a set of pixel positions having a size and shape encompassing all the pixels in the output array;

identifying second, third and forth reference values equal to an input image signal level stored in the second, third and forth quadrants of the 2×2 array of input image signals, respectively;

setting the image signal level of the second cluster of output pixels to the second reference value;

setting the image signal level of the third cluster of output pixels to the third reference value;

setting the image signal level of the fourth cluster of output pixels to the fourth reference value;

comparing image signals of a set of first dimension pixel positions within a window encompassing the 2×2 array of input image pixel positions to a template-based filter to identify a match; and modifying, only in response to a template filter match, the image signal level of at least one of the output image signals.

9. An image processing system for mapping a plurality of input image signals of a first resolution representing a two-dimensional input image to produce a plurality of image signals of a second resolution representing a two-dimensional output image where the second resolution is a non-integer multiple of the first resolution that is printed by a printer connected to receive the two-dimensional output image from the image processing system, including:

an input buffer for storing image signals, said input buffer is an array suitable for storing a predetermined number of input image signals associated with pixel positions of the first resolution;

an output image signal buffer for storing a plurality of output image signals at the second resolution;

buffer logic for controlling the storage of input image signals stored in said input buffer in association with the retrieval of output image signals from said output image signal buffer;

first reference value logic for setting a reference value equal to that of a first pixel location stored within the input buffer and storing the reference value in memory locations corresponding to a first set of output pixels within said output image signal buffer;

a template-based filter for detecting when the input image stored in the input buffer includes an image signal pattern matching one of a plurality of predefined templates stored therein, and generating a signal upon such detection;

output pixel logic circuitry for modifying, in response to the template-based filter signal, the image signal level of at least one of the first set of output pixels in response to the detection of a template filter match.

10. The apparatus of claim 9, further including:

second reference value logic for setting a second reference value equal to that of a second pixel location stored within the input buffer and storing the second reference value in memory locations corresponding to a second set of output pixels within said output image signal buffer;

a second template-based filter for detecting when the input image stored in the input buffer includes an image signal pattern matching one of a second plurality of predefined templates stored therein, and generating a second signal upon such detection;

second output pixel logic circuitry for modifying, in response to the second template-based filter signal, the image signal level of at least one of the second set of output pixels in response to the detection of a second template filter match as indicated by the second signal.

11. The apparatus of claim 10, wherein the first and second sets of output pixels are interlocked.

12. The apparatus of claim 10, wherein the first set of output pixels and the second set of output pixels are interlocked by alternately activating neighboring pixels so as to give an appearance in the two-dimensional output image that edges represented within the input image are similarly positioned therein.

13. A method, operating in an image processing system including a central processing unit, for mapping a plurality of first resolution input image signals representing a two-dimensional input image to produce a plurality of second resolution image signals representing a two-dimensional output image where the second resolution is higher than the first resolution, including the steps of:

generating a template-based filter by identifying a plurality of central pixel positions within a window at the first resolution, point mapping each central pixel position to a plurality of pixel positions at a third resolution higher than the second resolution, for each pixel position of a second resolution output image, selecting one of the pixel positions of the third resolution point map and associating the selected pixel position with the image value of the second resolution pixel position, and repeating the process until each of the second resolution pixel positions is represented by a third resolution pixel position from which a reference value will be obtained;

defining a cluster of output pixel positions, wherein the cluster is a set of pixel positions having a size and two-dimensional shape encompassing a predetermined number of output pixel positions at the second resolution;

identifying a first reference value equal to an input image signal level of a reference pixel position;

setting the image signal level of the cluster of output pixels to the first reference value;

comparing image signals of a set of first dimension pixel positions within a window encompassing the reference pixel position to a template-based filter to identify a match; and modifying, only in response to a template filter match, the image signal level of at least one of the cluster of output pixels.

* * * * *